United States Patent [19]

La Russa

[11] 4,163,542
[45] * Aug. 7, 1979

[54] OPTICAL IMAGE-FORMING APPARATUS WITH TILTED BI-REFRINGENT ELEMENTS

[75] Inventor: Joseph A. La Russa, Yorktown Heights, N.Y.

[73] Assignee: Farrand Optical Co., Inc., Valhalla, N.Y.

[*] Notice: The portion of the term of this patent subsequent to Jun. 6, 1995, has been disclaimed.

[21] Appl. No.: 828,783

[22] Filed: Aug. 29, 1977

Related U.S. Application Data

[63] Continuation-in-part of Ser. No. 685,017, May 10, 1976, Pat. No. 4,093,347.

[51] Int. Cl.² ............................ G02B 5/32; G02B 27/28
[52] U.S. Cl. ................................. 350/3.72; 350/147; 350/157; 350/174; 350/293
[58] Field of Search ....................... 350/174, 3.72, 157, 350/152, 147, 201, 202, 276 SL, 175 E, 10

[56] References Cited

U.S. PATENT DOCUMENTS

| Re. 27,356 | 5/1972 | La Russa | 350/157 |
| 1,693,021 | 11/1928 | Cameron | 350/175 E |
| 2,821,109 | 1/1958 | Nicoll | 350/276 SL |
| 2,920,527 | 1/1960 | Cloupeau | 350/174 |
| 3,940,203 | 2/1976 | La Russa | 350/3.72 |
| 4,093,347 | 6/1978 | La Russa | 350/174 |

Primary Examiner—Ronald J. Stern
Attorney, Agent, or Firm—John L. Downing

[57] ABSTRACT

Undesired images and reflections are eliminated in an in-line infinity display system by tilting the bi-refringent package of the display system at an angle with respect to a plane normal to the optical axis of the curved mirror in the display system and the observer's location so that the undesired images and reflections are directed outside the observer's field of view.

4 Claims, 7 Drawing Figures

OPTICAL IMAGE-FORMING APPARATUS WITH TILTED BI-REFRINGENT ELEMENTS

CROSS REFERENCE TO RELATED APPLICATION

This application is a continuation-in-part of U.S. Patent Application Ser. No. 685,017 for "Optical Simulation Apparatus" by Joseph LaRussa, filed May 10, 1976, now U.S. Pat. No. 4,093,347.

BACKGROUND OF THE INVENTION

1. Field of the Invention

The present invention relates to image forming apparatus, and more particularly to an improved infinity display optical system.

2. Description of the Prior Art

U.S. Pat. No. Re. 27,356, issued May 9, 1972 for "Infinite Optical Image-Forming Apparatus" by Joseph LaRussa describes apparatus for forming, preferably at or near infinity, an image of an object or of a plurality of images optically superimposed, the apparatus having a large exit pupil and a wide angular field of view. Such apparatus is presently manufactured by Farrand Optical Co., Inc., under the trademark PANCAKE WINDOW infinity display system.

The infinity display system described in that Reissue patent employs a beam-splitting (i.e., partially transmitting), curved mirror; a first quarter-wave plate disposed on the concave side of the curved mirror; a second beam-splitting mirror disposed on the side of the first quarter-wave plate remote from the curved mirror; a second quarter-wave plate disposed on the side of the second beam-splitting mirror remote from the first quarter-wave plate; and a polarizer on the side of the second quarter-wave plate remote from the second beam-splitting mirror; the first and second quarter-wave plates having their fast axes oriented with respect to each other at a substantially integral multiple of 90°, and the polarizer having its plane of polarization oriented substantially at an odd integral multiple of 45° to the fast axis of the second quarter-wave plate. Commonly, another polarizer is employed on the side of the curved mirror remote from the first quarter-wave plate, the direction of polarizations of said polarizer and said other polarizer being oriented with respect to each other at a second substantially integral multiple of 90°, both said first and second multiples of 90° being even or both being odd. A detailed description of this infinity display system and its operation are given in said U.S. Pat. No. Re. 27,356, which is incorporated herein by reference.

U.S. Pat. No. 3,940,203, for "Image-Forming Apparatus" by Joseph LaRussa issued Feb. 24, 1976 also describes the preparation of a holographic analog of the above-described infinity display system, or its like, and this patent is similarly incorporated herein by reference.

As described in the aforementioned U.S. patents, an image or a plurality of images, which may or may not be linearly polarized, are projected from a display means through the nearest plane polarizer, through the beam-splitting curved mirror (usually spherical), or holographic analog thereof, and thence to the sandwich-like arrangement of quarter-wave plates, plane beam-splitter and polarizer elements toward the observer. The linearly polarized image which passes through the beam-splitting mirror is first circularly polarized in one direction by the first quarter-wave plate and then reflected by the plane beam-splitting mirror back toward the curved mirror which collimates it, passes it through to the second quarter-wave plate which reverses the circular polarization and permits the collimated image to be passed through the final plane polarizer to the observer who views the image as though it were at or near infinity. The portion of the image which is reflected by the plane beam-splitting mirror back to the collimating curved mirror and through the mirror is not seen by the observer, nor should any portion of the image pass directly through the apparatus to the observer.

Whether the optical element serving as the beam-splitting curved mirror is a true mirror or a holographic analog thereof, the components of the infinity display apparatus can be assembled to form a compact layered unit. Because in the cemented assembly of polarizers, quarter-wave plates and plane beam-splitter the bi-refringent quarter-wave plates cause the polarized light to rotate its plane of polarization, the cemented assembly is frequently termed the "bi-refringent package", and it, together with the curved mirror or its holographic analog, form the sandwich-like infinity display system.

Certain imperfections have been observed with the use of the above-noted infinity-display systems, and the following description illustrates how the present invention eliminates those imperfections. In illustrating these imperfections, the "hardest case" example has been shown, i.e. where the point of interest on the display screen is at right angles to the polaroid and bi-refringent panels.

BRIEF SUMMARY OF THE INVENTION

The present invention comprises display means for displaying an image toward an observer position, and an in-line infinity display apparatus disposed between the display means and the observer position. The in-line infinity display apparatus comprises a bi-refringent package and an optical element functioning as a beam-splitting curved mirror having an optical axis in line with the observer position, and the plane of the bi-refringent package is tilted at an angle with respect to a plane normal to said optical axis.

The optical element of the bi-refringent package can be a beam-splitting curved mirror such as a spherical mirror or a parabolic mirror, or it can also be a holographic analog of such a mirror.

BRIEF DESCRIPTION OF THE DRAWING

FIG. 1(*b*) is a schematic diagram of an infinity display system illustrating a second imperfection present in prior art apparatus.

FIG. 1(*c*) is a schematic illustration of an infinity display system illustrating a third imperfection present in prior art apparatus.

DESCRIPTION OF A SPECIFIC EMBODIMENT

Figure 1A:
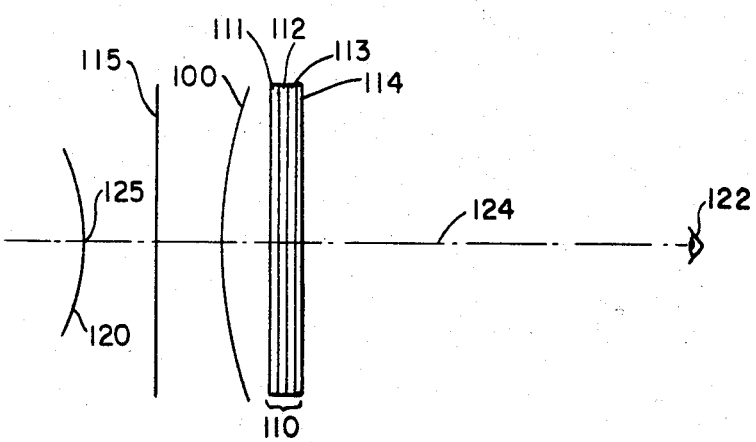
FIG. 1(*a*) is a schematic diagram of an infinity display system illustrating a first imperfection present in prior art apparatus.
Figure 1B:
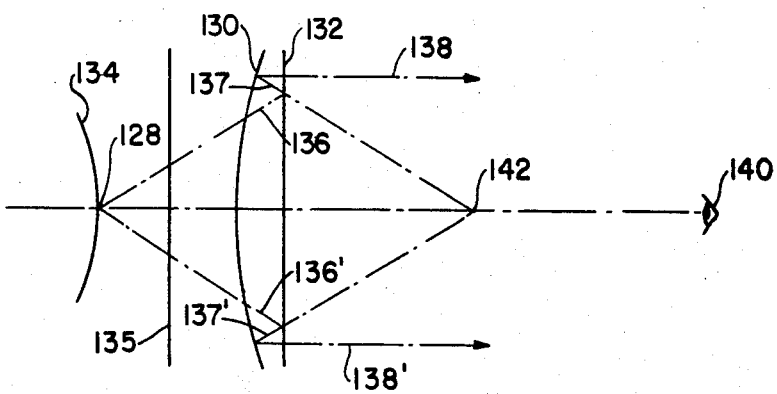
Figure 1C:
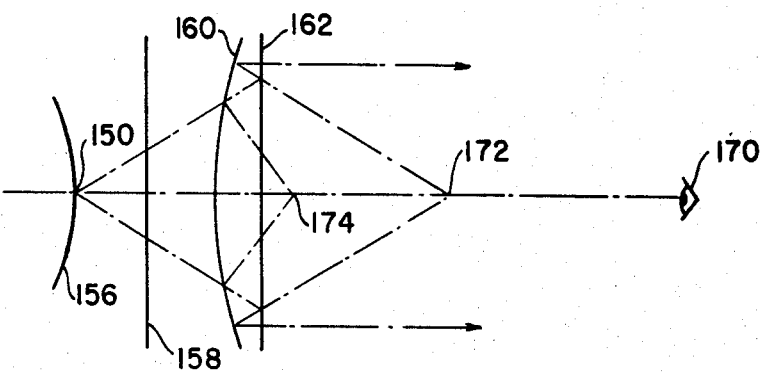

Three imperfections which have been noted with the above described infinity display system are illustrated in FIGS. 1(a), 1(b), and 1(c). In FIG. 1(a) a spherical beam-splitting mirror 100 is combined with a bi-refringent beam-splitting package 110 to form the infinite image-forming apparatus described in the aforementioned U.S. Pat. No. Re. 27,356. The bi-refringent beam-splitting package 110 is composed of a first quarter-wave plate 111, a plane beam-splitting mirror 112, a second quarter-wave plate 113 and a polarizer 114 with the fast axes of the quarter-wave plates arranged in accordance with the description given above and in that Reissue patent. Another polarizer 115 having its axis of polarization relative to polarizer 114 as also described above is positioned between the bi-refringent beam-splitting package 110 and a display screen 120 having thereon one or more superimposed images. An observer location 122 is positioned on the side of the package 110 away from the screen. The infinity display system of elements 100, 110 and 115 give the observer 122 the illusion that the image or images on display screen 120 are at or near infinity in distance.

Thus, in this prior arrangement light from the display screen 120 is transmitted through the polarizer 115, and spherical beam-splitting mirror 100, reflected by the plane beam-splitter 112 so that the apparent position of the display screen 120 is at the focus of the spherical beam-splitting mirror 100, and is then projected to infinity by the mirror 100. Unwanted direct light and other possible unwanted images are greatly attenuated by the polarizing elements 114 and 115. Unfortunately, with the present state of the art these polarizing elements are not 100% efficient in eliminating these unwanted images.

FIG. 1(a) illustrates a first problem when a high-contrast, bright object is observed through the system against a dark background (as when a bright star is seen against a pitch black sky). In such an event, the bright image at a point 125, for example, on display screen 120 may be transmitted directly to an observer at location 122 along path 124 through the imperfect polarizing elements 114 and 115 so that it would appear to the observer to lie on surface of the screen 120 rather than at infinity. This direct, unwanted image is often called "bleedthrough", and is ordinarily of the order of 1/75 of the brightness of the wanted or infinity image.

FIG. 1(b) shows a second order problem associated with that illustrated in FIG. 1(a). A bright object 128 appearing on display screen 134 is collimated by its passage through polarizer 135, mirror element 130 and bi-refringent package 132 (which in all respects is identical to package 110 of FIG. 1(a)) as for example, along paths 136–138 and 136'–138' to appear to an observer at location 140 to be at infinity. However, because of the imperfections of the polarizer in package 132, the reflection of the image point 128 from the plane beam-splitter in package 132 and its re-imaging by the spherical beam-splitting mirror 130 can form a ghost image at a point 142. This image, viewable by the observer, is called an R-2 ghost and is formed at a distance from the spherical mirror 130 equal to its focal length.

Another in the family of unwanted images is shown being created in FIG. 1(c). There a bright image point 150 on a screen 156 is collimated by its passage through a polarizer 158, beam-splitting spherical mirror 160 and a bi-refringent package 162 (which in all respects is identical to the package 110 described in connection with FIG. 1(a)); so that an observer at a location 170 views the object 150 as being at or near infinity. Also, as described in FIG. 1(b) an R-2 ghost may be formed at point 172 from the reflection of image point 150 from the plane beam-splitter in package 162 and its re-imaging by the spherical mirror 120. Further, another ghost image of point 150, called an R-3 ghost, may be formed at a point 174 due to the reflection of the R-2 ghost image from the plane beam-splitter of the bi-refringent package 162 and its re-imaging by the spherical mirror 160. The R-3 ghost is formed between the R-2 ghost and the mirror 160, usually close to the plane beam-splitter in the package 162.

Figure 2:
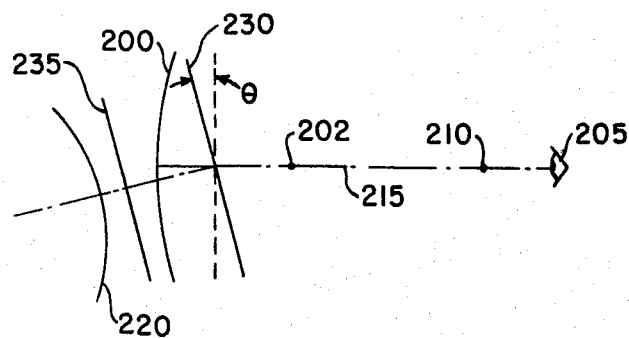
FIG. 2 is a schematic diagram of a specific embodiment of an infinity display system in accordance with the present invention.

To reduce and/or eliminate these defects, the present invention, an embodiment of which is shown in FIG. 2 provides a spherical beam-splitting mirror 200 having a focal point 202 and an observer location 205 approximately at the center of curvature 210 of the spherical mirror 200, forming an optical axis 215. A display screen 220 is disposed on the other side of the mirror 200. A bi-refringent beam-splitting package 230 of the infinity display system (identical to the package 110 described in connection with FIG. 1(a)) and a plane polarizer 235 similar to polarizer 115 of FIG. 1(a) are also disposed about the spherical mirror 200, however, the planes of the package 230 and polarizer 235 are tilted at an angle $\theta$ with respect to the normal to the optical axis 215 formed by the line from the focal point 202 and center of curvature 210 of the spherical mirror 200 to the observer's location 205. In the embodiment shown the angle is approximately 14°, however other angles can be chosen depending upon the focal length of the mirror involved, and the distance from the mirror 200 to the observer location 205.

Figure 3A:
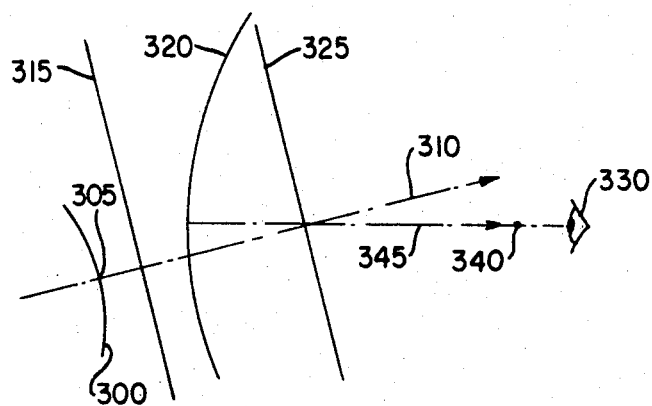
FIG. 3(*a*), 3(*b*), and 3(*c*) are schematic diagrams showing how the three imperfections shown in FIGS. 1(*a*), 1(*b*), and 1(*c*) are respectively eliminated by the infinity display system of FIG. 2.
Figure 3B:
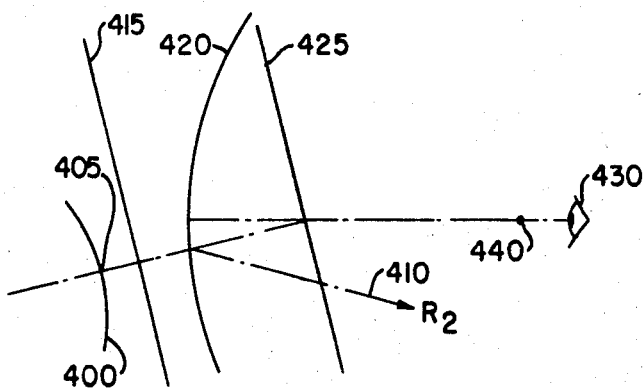
Figure 3C:
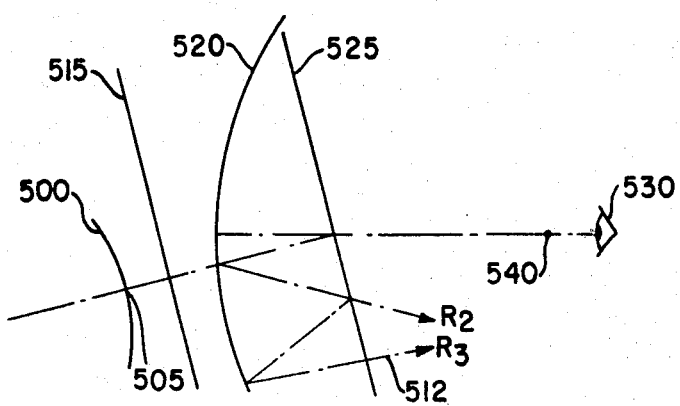

The previously described defects are eliminated by this tilted arrangement as shown in FIGS. 3(a), 3(b), and 3(c). In FIG. 3(a), a direct, unwanted "bleedthrough" image at point 305 on screen 300 is transmitted along path 310 through tilted polarizer 315 spherical beam-splitting mirror 320 and tilted bi-refringent beam-splitting package 325 so that it is eliminated from the field of view of the observer at location 330 which is directed in line with the center of curvature point 340 and optical axis 345 of the mirror 320.

The R-2 ghost image is shown in FIG. 3(b) being transmitted from screen 400 at a point 405 along path 410 through a tilted polarizer 415, spherical beam-splitting mirror 420, and a tilted bi-refringent beam-splitting package 425 so that it is redirected outside the viewing field of the observer at location 430 which is centered about the line formed by the center of curvature 440 of mirror 420 and the observer's eye.

The R-3 ghost is shown in FIG. 3(c) being transmitted from display screen 500 at a point 505 along path 510 through a tilted polarizer 515, spherical beam-splitting mirror 520 and a tilted bi-refringent beam-splitting package 525 to form the deflected R-2 ghost, and then the R-2 ghost image is reflected from the plane beam-splitter in package 525 back to the mirror 520 which redirects it as an R-3 ghost along path 512 to a position well outside the field of view of an observer at location 530 centered about the line from the observer through the center of curvature 540 of the spherical mirror 520.

In general, the curved mirror element (or holographic analog thereof) of the present invention may have as an aperture a cross section equivalent to a conic section, and the optical axis of the mirror element can be defined as the center of curvature of said mirror and a point on the focal surface which when projected by the system passes through the center of curvature of the mirror and the observer's location.

What is claimed is:
1. Optical apparatus comprising:
   (a) display means for displaying an image toward an observer location; and
   (b) infinity display means positioned between said display means and said observer location, said infinity display means comprising:
      1. an optical element functioning as a beam-splitting curved mirror having a predetermined optical axis between said element and said observer location; and
      2. a bi-refringent package comprising:
         (A) a first quarter-wave plate disposed on the concave side of said optical element;
         (B) a plane beam-splitting mirror disposed on the side of the first quarter-wave plate remote from the optical element;
         (C) a second quarter-wave plate disposed on the side of the plane beam-splitting mirror remote from the first quarter-wave plate; and
         (D) a polarizer on the side of the second quarter-wave plate remote from the plane beam-splitting mirror; the first and second quarter-wave plates having their fast axes oriented with respect to each other at a substantially integral multiple of 90°, and the polarizer having its plane of polarization oriented substantially at an odd integral multiple of 45° to the fast axis of the second quarter-wave plate;
      wherein the bi-refringent package is tilted with respect to a plane normal to the optical axis between said element and said observer location, so that certain undesired images and reflections are directed away from said observer location and are brought to a focus closer than infinity.

2. Optical apparatus according to claim 1 further comprising another polarizer disposed on the side of the optical element remote from the first quarter-wave plate, the directions of polarization of said polarizer and said other polarizer being oriented with respect to each other at a second substantially integral multiple of 90°, both said first and second multiples of 90° being even or both being odd, wherein the plane of said other polarizer has substantially the same tilt as said bi-refringent package.

3. Optical apparatus according to claim 1 wherein said optical element is a beam-splitting curved mirror.

4. Optical apparatus according to claim 1 wherein said optical element is a holographic analog of a beam-splitting curved mirror.

* * * * *